Aug. 23, 1960 M. A. CALOVOLO 2,949,902
ENGINE TRANSMISSION UNIT INVOLVING VARIABLE SUPERCHARGING
Filed May 28, 1957 5 Sheets-Sheet 1

INVENTOR.
MARIO ANGELO CALOVOLO
BY
Carl Miller
ATTORNEY

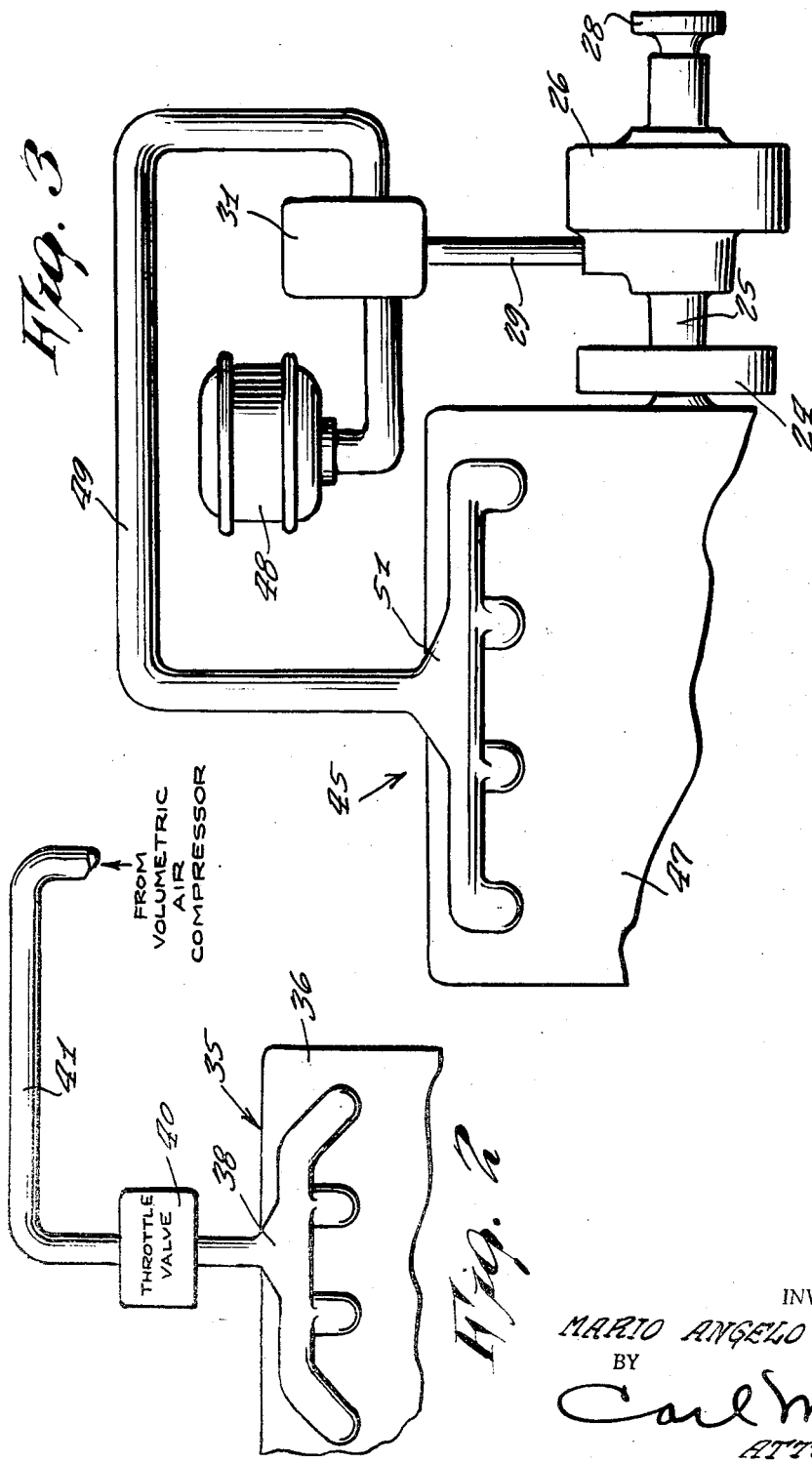

Aug. 23, 1960 M. A. CALOVOLO 2,949,902
ENGINE TRANSMISSION UNIT INVOLVING VARIABLE SUPERCHARGING
Filed May 28, 1957 5 Sheets-Sheet 3
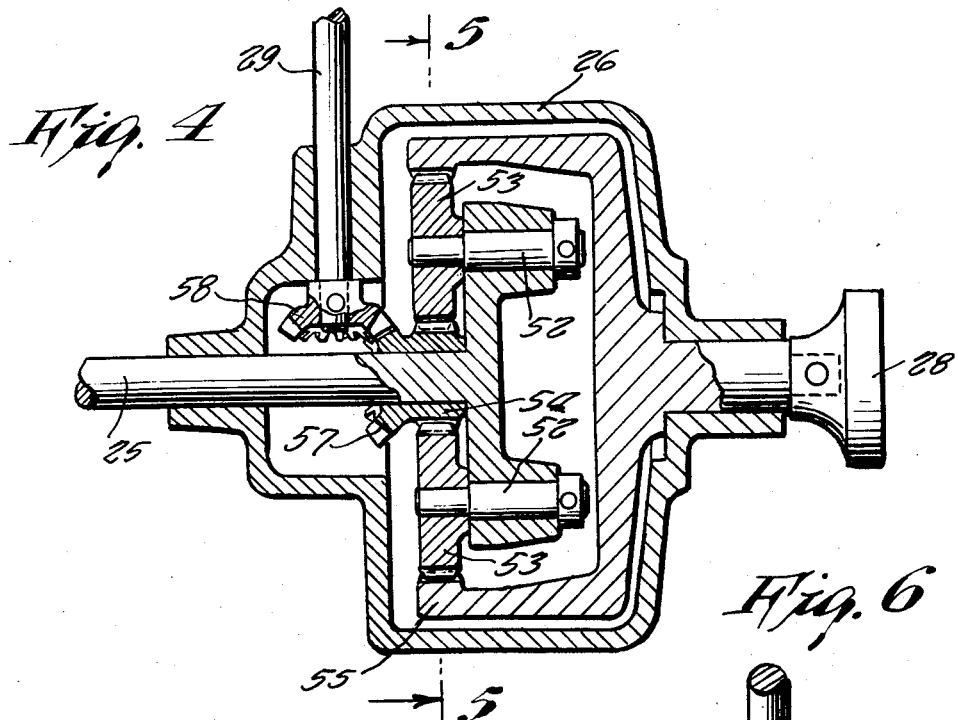
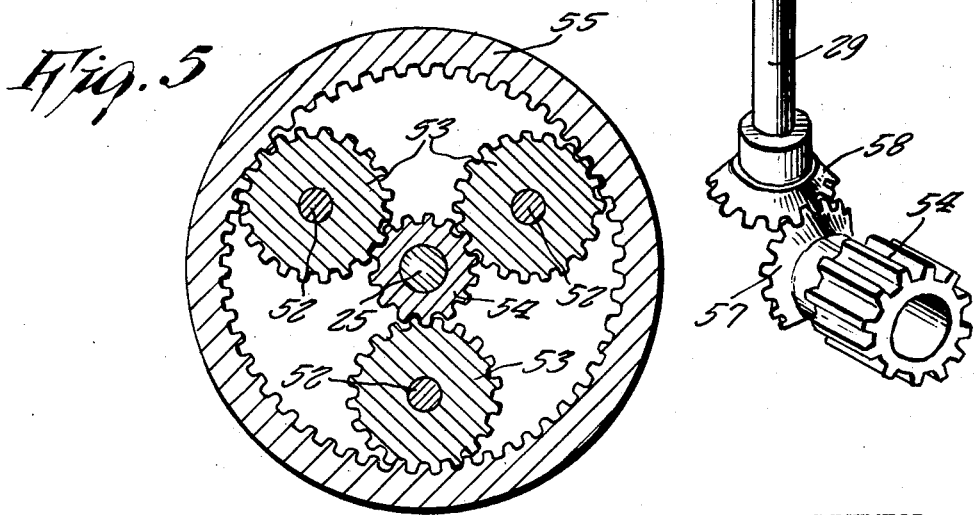
INVENTOR.
MARIO ANGELO CALOVOLO
BY
Carl Miller
ATTORNEY

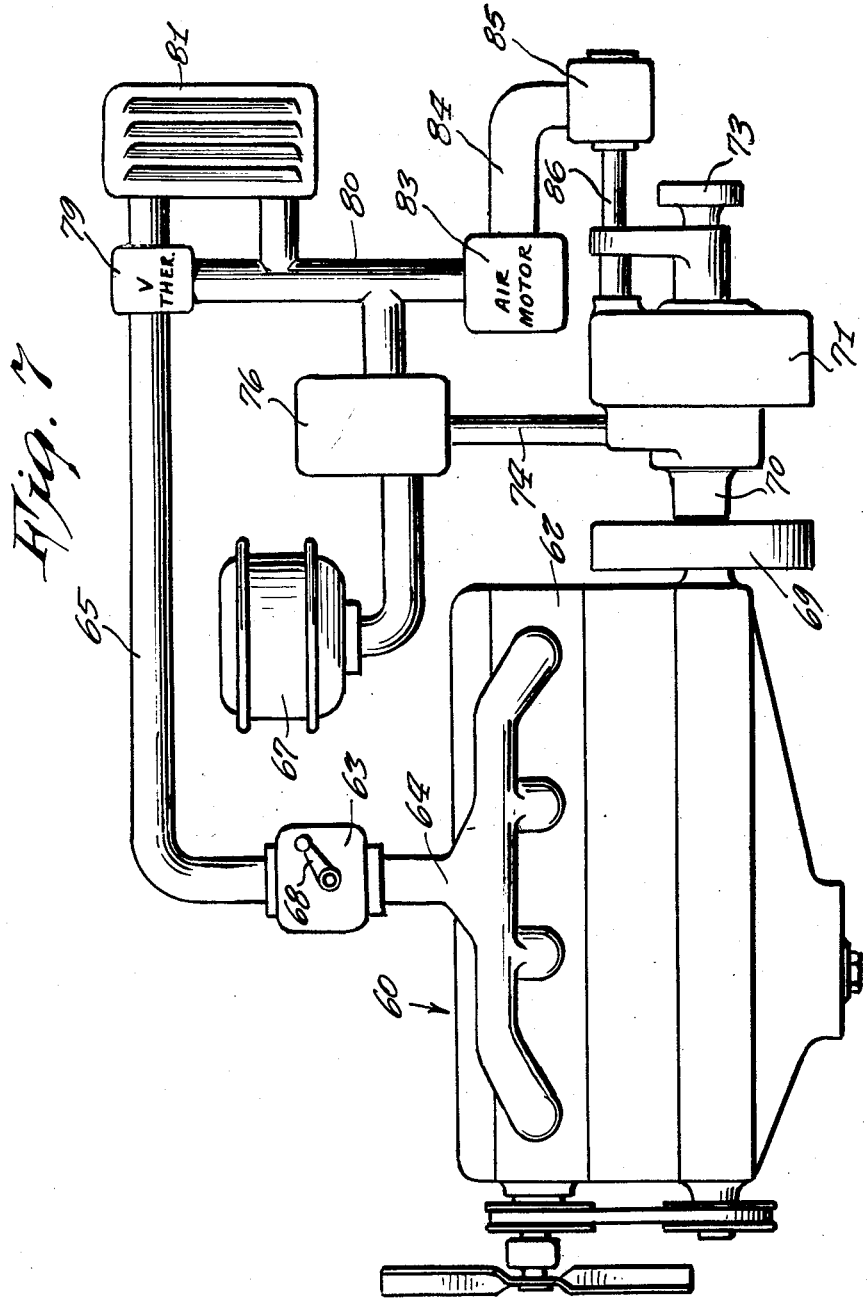

Aug. 23, 1960  M. A. CALOVOLO  2,949,902
ENGINE TRANSMISSION UNIT INVOLVING VARIABLE SUPERCHARGING
Filed May 28, 1957  5 Sheets-Sheet 5
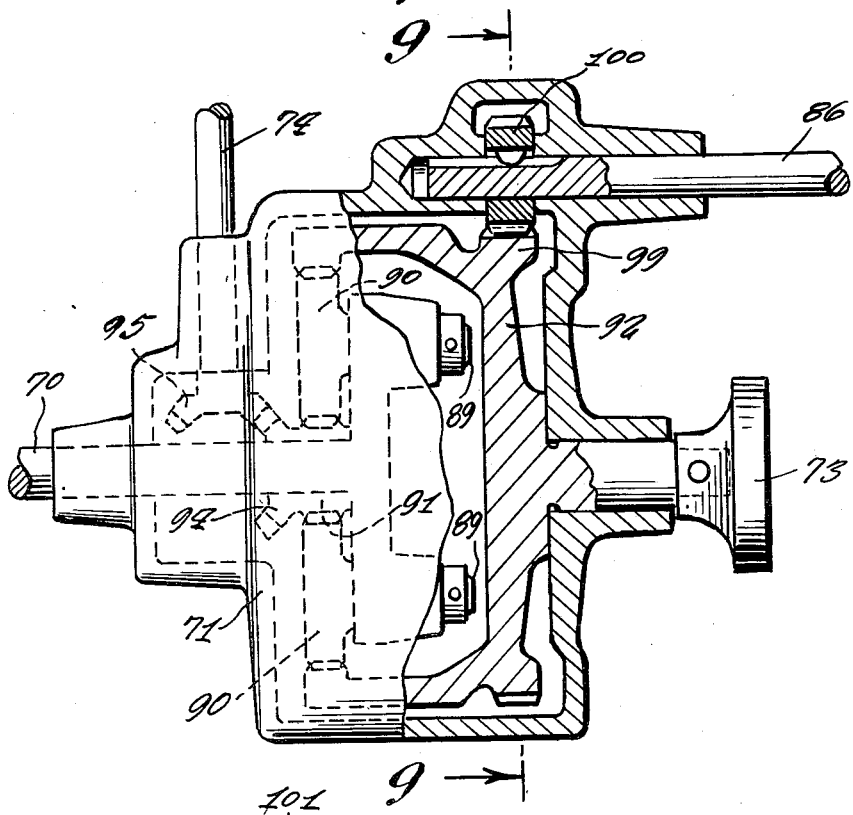
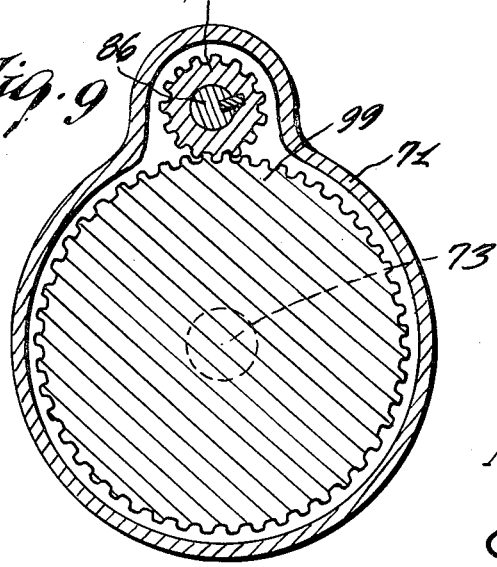
INVENTOR.
MARIO ANGELO CALOVOLO
BY
Carl Miller
ATTORNEY

United States Patent Office 2,949,902
Patented Aug. 23, 1960

2,949,902

ENGINE TRANSMISSION UNIT INVOLVING VARIABLE SUPERCHARGING

Mario Angelo Calovolo, 111 7th St., Garden City, N.Y.

Filed May 28, 1957, Ser. No. 662,153

2 Claims. (Cl. 123—119)

This invention relates to internal combustion engines and more particularly to a new kind of engine-transmission unit.

There has long been a need for an engine transmission unit that will fit the most severe requirements of continuously variable speed ratios. It is therefore an object of the present invention to provide a novel engine transmission unit of great mechanical simplicity, with a substantial improvement in efficiency as compared, particularly, to hydraulic torque converters.

It is another object of the present invention to provide an engine transmission unit of comparatively high efficiency throughout the entire field of speed ratios throughout the entire power transmission train.

It is another object of the present invention to provide a transmission unit for internal combustion engines having positive mechanical linkage between the engine and transmission unit, completely devoid of any clutch elements and of extreme simplicity and compactness.

A still further object of the present invention is to provide an engine transmission unit having relatively low wear characteristics, relatively few parts to replace, and substantially foolproof in operation.

All of the foregoing and still further objects and advantages of this invention will become apparent from a study of the following specification, taken in connection with the accompanying drawing, wherein:

Figure 2 is a fragmentary side elevational view of a modified form of engine tranmission unit made in accordance with the present invention;

Figure 3 is a side elevational view of a still further modified form of an engine transmission unit;

Figure 4 is a longitudinal cross sectional view of the transmission gear system used in connection with the embodiments disclosed in Figures 1 to 3;

Figure 5 is a transverse cross sectional view taken along line 5—5 of Figure 4;

Figure 6 is a fragmentary perspective view showing certain of the operating elements of the gear system shown in Figure 4;

Figure 7 is a view similar to Figure 1 showing a still further modified form of the present invention;

Figure 8 is an enlarged longitudinal cross sectional view of the transmission unit forming a part of the apparatus shown in Figure 7; and Figure 9 is a transverse cross sectional view taken along line 9—9 of Figure 8.

Figure 1:
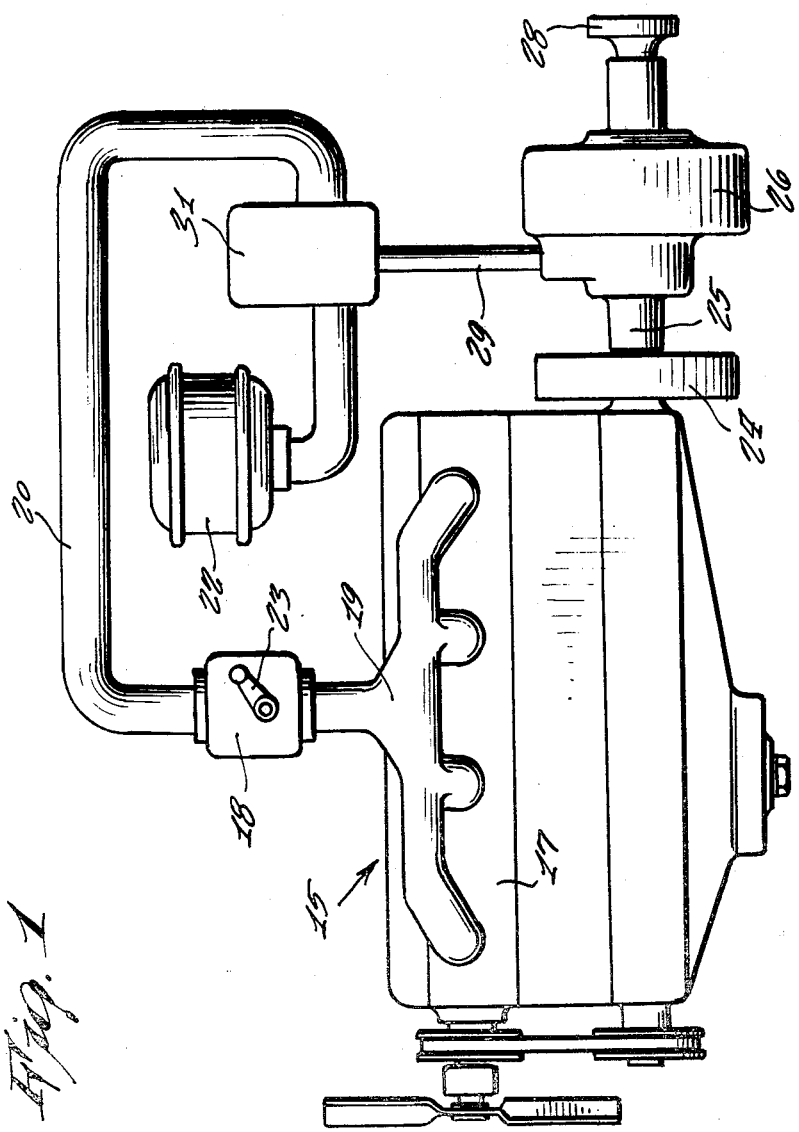
Figure 1 is a side elevational view of an engine transmission unit made in accordance with one form of the present invention.

Referring now to the drawing, and more particularly to Figure 1 thereof, an engine transmission unit 15 made in accordance with one form of the present invention is shown to include a reciprocating internal combustion engine 17 having a fuel and air supply system associated therewith. The combustion fuel and air supply system includes a carburetor 18, an intake manifold 19, an intake air supply duct 20, and an air filter 22 all arranged in series. The carburetor 18 is provided with a butterfly control arm 23 for controlling the engine in a conventional manner. The engine is also provided with a primary power drive shaft 25 to which a fly wheel 24 is secured and which extends in driving relationship into a gear casing 26. An output transmission shaft 28 is disposed at the opposite side of the gear case 26, and a secondary drive shaft 29 extends radially outwardly from the gear case 26. As will be hereinafter described, the secondary drive shaft 29 is in driving engagement with a volumetric air compresser 31 that is disposed intermediate the air filter 22 and the carburetor 28.

In Figure 2 of the drawing, a modified engine transmission assembly 35 is shown to include an internal combustion engine 36 of the Diesel type in which the intake manifold 38 is provided with a throttle valve 40 in place of the usual carburetor associated with gasoline engines. An air intake duct 41 extends between the volumetric air compresser, and the throttle valve 40 for supplying a pressurized stream of air to the manifold 38.

In Figure 3 of the drawing, a still further modified form of engine transmission unit 45 is shown wherein the internal combustion engine 47 is provided with an intake manifold 51 which is supplied with pressurized air from the air cleaner 48 through the intake duct 49 directly from the volumetric air compresser 31. This assembly is also provided with a primary drive shaft 25 to which a fly wheel 24 is secured and which is in driving association with an output shaft 28 through the gear system contained within the casing 26. The secondary drive shaft 29 is in the form of a power take off that drives the volumetric air compresser 31 in a manner hereinafter described.

Referring now to Figures 4 to 6 of the drawing, the transmission gear system used in connection with the engine transmission units shown in Figures 1 to 3, is shown to include the main casing 26. The outer end of the primary drive shaft 25 is provided with a web upon which a plurality of circumferentially spaced planetary gears are rotatably supported upon gear shafts 52. These planetary gears 53 are in meshing engagement with a sun gear 54 rotatably carried upon the shaft 25 and an internal gear 55 that is integrally connected to the output shaft 28. Thus, upon rotation of the primary shaft 25, the output shaft 28 is rotated through the planetary gear system in a conventional manner. The sun gear 54 is also provided with an intermediate gear 57 which is in direct meshing engagement with a mating gear 58 carried at the lower end of the secondary drive shaft 29. Thus, upon rotation of the primary drive shaft 25, both the output shaft 28 and the secondary drive shaft 29 are rotated. The functional behavior of the unit is such that for a given speed of the engine, a linear relationship exists between the speeds of the primary drive shaft 25, the output shaft 28, and the secondary shaft 29. It thus follows that any increase in the speed of the secondary drive shaft 29 involves a decrease in the speed of the output shaft 28, and vice-versa. Furthermore, the ratios between the torques acting upon the aforesaid parts are constant, independently of the speed thereof. The torque that is available at the output shaft 28 for a given and fixed position of the engine speed control device, depends upon the speed of the part itself. Indeed, a reduction in the speed of the output shaft 28 involves an increase in the speed of the secondary shaft 29 which drives the air compresser and, possibly, a reduction in the speed of the primary drive shaft 25. Thus, the ratio of the speeds between the secondary shaft 29 and the primary drive shaft 25 is increased. Furthermore, the intake manifold pressure and the flow of air and combustible material through the engine results increased whereby the torque of the drive shaft 25 is also increased. However, the ratio of torques between the output and the input shafts is a constant such that the torque available at the output shaft is also increased as the speed of the output shaft decreases. It will therefore be recognized that the maximum torque on the output shaft occurs when its speed is zero and the engine is running at full throttle, the torque on the output shaft being zero when its speed exceeds the speed of the engine a predetermined amount.

When the unit is to be used within a very wide range of torques and speeds, such as for use with motor vehicles, it may be that the maximum rate of supercharging will rise to very high values, such as to be inadmissible by common engine techniques. In such cases, some supplementary device can be added to the basic unit. With reference now to Figures 7 to 11, a modified form 60 of engine transmission unit is shown for venting some of the unusable compressed stream. In this arrangement, the engine 62 is provided with a carburetor 63 intermediate the intake manifold 64 and the air filter 67, these parts being connected together by intake ducts 65. The conventional butterfly valve control arm 68 is also provided for controlling the supply of fuel to the engine. The primary drive shaft 70 of the engine is provided with a fly wheel 69 and extends into driving engagement with the gear system within the gear case 71. The secondary drive shaft 74 extending outwardly from the gear case 71 is used to operate the volumetric air compresser 76 as hereinbefore described. This assembly can also be provided with a thermostatically controlled deviator 79 which is intermediate the carburetor and air compresser and provided with a connection duct 80 that is associated with an air cooler 81. It will be noted that the cooler 81 is in parallel with the series connected elements of the combustion fuel and air supply system, so that the compressed air feeding the engine passes through the cooler 81 only when its temperature exceeds any predetermined value.

As is more clearly shown in Figures 7 to 9, the air engine shaft 86 extends into the gear casing 71 and is provided with a keyed pinion 100. This pinion is in driving engagement with a gear 99 forming an integral part of the internal gear 92 that is integral with the output shaft 73. The planetary gears 90 are rotatably supported upon their shafts 89 on the output end of the primary drive shaft 70. These planetary gears 90 are in driving engagement with the sun gear 91 which is also provided with an intermediate gear 94. In the manner hereinbefore described, the intermediate gear 94 meshes with a mating gear 95 secured to the lower end of the secondary drive shaft 74 which operates the air compresser 76.

The relief valve 83 will not permit the engine to operate with intake pressures greater than any predetermined value, acting as a bypass for the air supply ducts. The air cooler 81 is a device widely used in the field of supercharged engines and is intended to improve the engines volumetric efficiency. In order to recover the internal energy of the air flowing outwardly through the relief valve 83, this air enters the air engine 85, therein its pressure energy being converted to mechanical energy, in which it assists in driving the output shaft 73. The operation of the form of the invention shown in Figures 7 to 9 is substantially the same as that described in connection with the embodiments of the present invention illustrated in Figures 1 to 6. For supercharging ratios exceeding a predetermined value, the intake manifold air pressure remains constant and the torque on a primary drive shaft and secondary drive shaft remains unchanged, as the speed of the output shaft decreases. Furthermore, in the aforementioned situations, the mass of air being released through the relief valve is used to generate additional torque on the output shaft so as to improve the engine and transmission efficiency. The maximum additional torque can be obtained when the output shaft is held stationary for reasons apparent from the foregoing discussion.

While this invention has been described with particular reference to the construction shown in the drawing, it is to be understood that such is not to be construed as imparting limitations upon the invention, which is best defined by the claims appended hereto.

Having thus described my invention, I claim as new and desire to secure by Letters Patent:

1. An engine transmission unit comprising, in combination, an internal combustion engine having combustion fuel and air supply apparatus, said engine having a power drive shaft, a planetary gear system associated with said drive shaft, a volumetric air compressor associated with said fuel and air supply apparatus, a drive connection between said gear system and said air compressor, said drive connection comprising a secondary drive shaft having a driven gear at one end, and said gear system including a sun gear, a driving intermediate gear integral with said sun gear, and said driven gear being in meshing engagement with said driving intermediate gear for rotating said secondary drive shaft, said fuel and air supply apparatus comprising an intake manifold, a carburetor, and an air filter, an intake duct connecting said manifold, carburetor, and air filter together in series relationship, a thermostatically controlled deviator intermediate said volumetric air compresser and said carburetor, an air duct connecting said thermostatically controlled deviator to said volumetric air compresser, and an air cooler in parallel relationship with said air duct.

2. An engine transmission unit as set forth in claim 1, further comprising a relief valve associated with said air duct and an air engine drivingly connected to said gear system.

References Cited in the file of this patent

UNITED STATES PATENTS

| | | |
|---|---|---|
| 1,732,405 | Invernizzi | Oct. 22, 1929 |
| 2,091,356 | Fawcett | Aug. 23, 1937 |
| 2,187,737 | Gregory | Jan. 23, 1940 |
| 2,467,077 | Brunken | Apr. 12, 1949 |